United States Patent
Booth, Jr.

(10) Patent No.: US 6,943,837 B1
(45) Date of Patent: Sep. 13, 2005

(54) METHOD AND APPARATUS FOR COLORMETRIC CHANNEL BALANCING FOR SOLID STATE IMAGE SENSOR USING TIME DIVISION MULTIPLEXED SAMPLING WAVEFORMS

(75) Inventor: Lawrence A. Booth, Jr., Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,979

(22) Filed: Dec. 31, 1999

(51) Int. Cl.[7] .............................. H04N 5/335

(52) U.S. Cl. ............... 348/297; 348/296; 348/223.1

(58) Field of Search .................... 348/223.1, 296, 348/273, 227.1, 237, 312, 272, 297; 358/513, 358/514, 518, 509, 512, 482, 483, 515; 250/208.1

(56) References Cited

U.S. PATENT DOCUMENTS

| | | | | |
|---|---|---|---|---|
| 5,880,859 A | * | 3/1999 | Hiromatsu | ................ 358/514 |
| 6,002,497 A | * | 12/1999 | Hirama | ................ 358/514 |
| 6,633,335 B1 | * | 10/2003 | Kwon et al. | ................ 348/308 |
| 6,714,239 B2 | * | 3/2004 | Guidash | ................ 348/280 |
| 2002/0180875 A1 | * | 12/2002 | Guidash | ................ 348/280 |

* cited by examiner

*Primary Examiner*—Wendy R. Garber
*Assistant Examiner*—Gary C. Vieaux
(74) *Attorney, Agent, or Firm*—Blakely, Sokoloff, Taylor & Zafman LLP

(57) ABSTRACT

A method including determining a first integration time for a first color channel and determining a second integration time for a second color channel, where the second integration time is shorter than the first integration time. Then, the second integration time is divided into a set of integration times. A first sensor is integrated over the first integration time; and, a second sensor is integrated over the set of integration times. An apparatus for performing the method.

15 Claims, 5 Drawing Sheets

METHOD AND APPARATUS FOR COLORMETRIC CHANNEL BALANCING FOR SOLID STATE IMAGE SENSOR USING TIME DIVISION MULTIPLEXED SAMPLING WAVEFORMS

FIELD OF THE INVENTION

This invention is related to the field of use of image sensor operation. More particularly, this invention is directed to a method and apparatus for colormetric channel balancing for solid state image sensor using time division multiplexed sampling waveforms.

BACKGROUND

Video image capture using a digital camera has become very prevalent. Video capture may be used for such applications as video conferencing, video editing, and distributed video training. Many components of hardware and software need to work seamlessly to both get the video data (also referred to as a video "stream") from the hardware through the various layers of software on the personal computer (PC) and made visible on a display medium such as a monitor.

Producing high quality images in color is desirable for electronic still image capture and video systems. Conventional methods of sensing and producing an image in color include the use of electronic charged-coupled device (CCD) or complimentary metal oxide semiconductor (CMOS) sensor arrays exposed to incident light. The sensor array is an array of photosites or pixels, each photosite loosely defined as a region containing photodetecting circuitry that includes, for example, photodiodes or photogates and associated processing circuitry. In some cases, a color filter array (CFA) is pasted or otherwise processed over the array of photodetecting circuits, such that each photodetecting circuit is covered by a bandpass optical filter that lets light of a particular color pass into and thus be detected by the corresponding circuit. Sensor arrays typically have two or more colors distributed evenly, or according to other schemes, in the array of photosites, where a group of photosites may be assigned a particular color.

To obtain sharp color images from such sensor arrays over a broad range of illuminants, it may be desirable to control the amount of light energy that is incident on the sensor array. One technique for doing so is to modulate the incident light using a physical shutter having variable timing, as in a conventional film camera. The idea of a shutter has been applied to digital solid state cameras in the form of an electronic shutter. For example, in CMOS sensor arrays, the electronic shutter is typically a transistor that couples a photo-detecting element, such as a photodiode, to a charge storage element, such as a capacitor, in each photosite. The electronic shutter transistor operates as a switch in response to a shutter control signal that specifies the "exposure time" by defining the time interval during which the shutter transistor is turned on allowing charge to transfer from the exposed photodiode and accumulate in the capacitor. Alternatively, the shutter transistor may be used to drain prestored charge from the capacitor.

Typically, prior art systems that use such electronic shutters provide a single shutter control signal for the entire sensor array. Thus, in most prior art systems, photosites of different colors receive the same exposure time. Although some systems permit different exposure times for each color, they do so by requiring separate and sequential exposures for each color, typically by using a mechanical apparatus to change the color filter over a panchromatic sensor array. Taking sequential exposures for each color effectively precludes taking color pictures of scenes that include motion. Moreover, such a complicated mechanical apparatus, normally used in devices such as flatbed scanners, would present reliability problems and would not be easily adaptable to portable image capture systems such as a digital handheld camera.

Although the technique of using a single shutter control line for the entire sensor array is relatively simple to implement, such an application may also yield poor quality images for illuminants other than broad daylight. Under low or uneven light conditions, colors for which there is a dearth of illumination are less apparent in the resulting image due to increased noise levels in the analog signals received from the photosites tuned for those "weaker" colors. Image processing algorithms may be used to somewhat improve image quality by canceling out the increased noise in the signals for the weaker colors. But such a software solution may introduce undesirable delays before the final image can be viewed. Moreover, the results of such software corrections are not always predictable or consistent.

Therefore, a hardware approach may be desirable to yield more consistent and predictable noise levels. Also, it is desirable to realize a color image system that can somewhat compensate for manufacturing variations in the myriad of photosites in a sensor array, including variations in the photodetecting circuitry and the bandpass filters of the CFA.

SUMMARY

In one embodiment, a method including determining a first integration time for a first color channel and determining a second integration time for a second color channel, where the second integration time is shorter than the first integration time. Then, the second integration time is divided into a set of integration times. A first sensor is integrated over the first integration time; and, a second sensor is integrated over the set of integration times.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention provides a method and apparatus for colormetric channel balancing for solid state image sensor using time division multiplexed sampling waveforms. In one mode of operation in performing an image capture, a set of integration (e.g., sample) signals is used, with a separate integration signal being used for each color.

Each separate integration signal is time division multiplexed to allow all separate integration signals to provide sequential color sampling while minimizing total integration time delay disparity. By minimizing total integration time delay disparity, motion artifacts are also reduced.

Figure 1A:
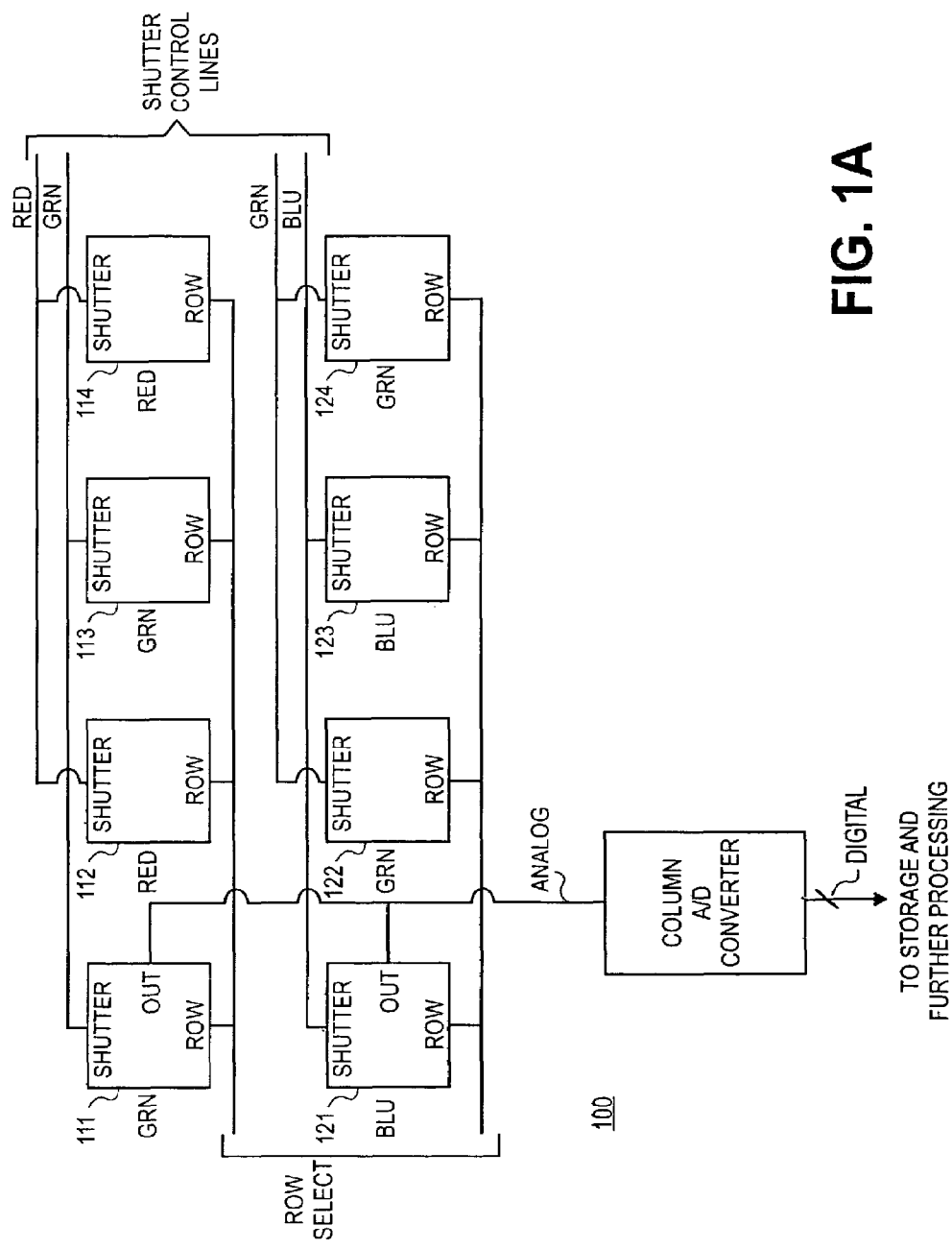
FIG. 1a illustrates an image sensor circuit according to a first embodiment of the present invention.

FIG. 1a illustrates a block diagram of an image sensor circuit 100 according to one embodiment of the invention. The circuit 100 has a sensor array of pixels or photosites 111, 112, . . . , arranged in rows and columns for that particular embodiment. A CFA (not shown) may be pasted or otherwise processed over the photo-detecting circuitry in the sensor array such that each photosite is in effect configured to detect incident light of a particular color, as indicated by the color label adjacent each photosite.

Figure 1B:
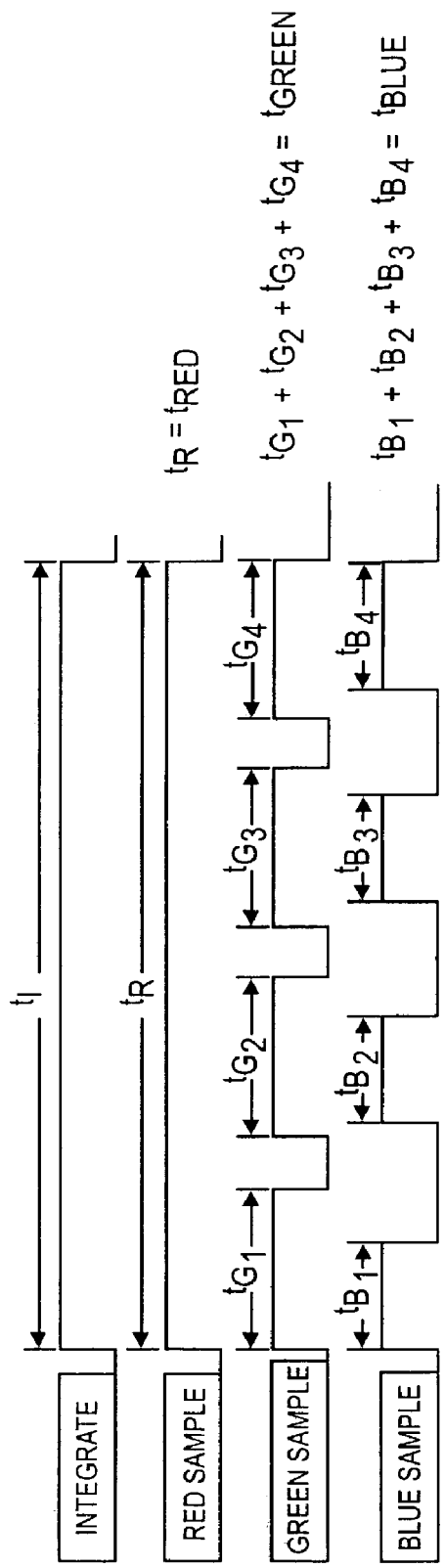
FIG. 1b shows exemplary shutter control signals for each color, according to one embodiment of the present invention.

An exemplary photosite 111 may have a green filter covering, and may include a row select input, an electronic shutter input, and an analog output. Not shown in each photosite is conventional read out circuitry that couples to a photo-detecting element such as a photodiode and allows the formation of a light-generated signal that is provided at the analog output. A single shutter control line is coupled to the shutter input of all photosites having the same color in a given row, where each control line receives an independent pulse-type shutter control signal, as shown in FIG. 1b.

The embodiment of the invention as circuit 100 also features a column Analog-to-Digital (A/D) converter where the light-generated signals from a given column are multiplexed and converted by the column A/D converter into digital format one row at a time. Another scheme may use A/D converters for each row, so that the digital signals are read per column. In either case, the digital signals may then be subsequently stored and further processed.

Figure 2:
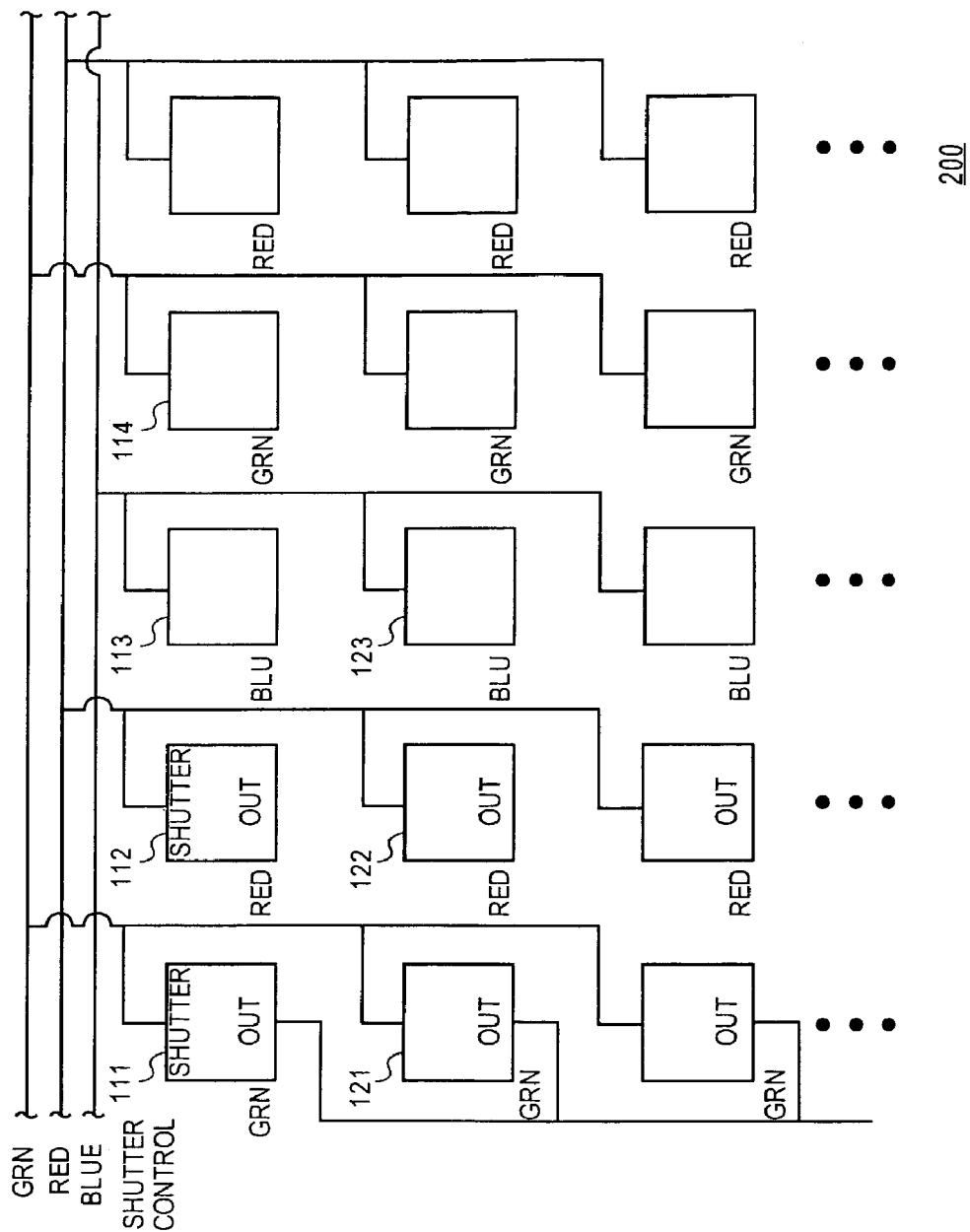
FIG. 2 shows an image sensor circuit according to a second embodiment of the present invention.

The array of circuit 100 employs one particular distribution of colors. However, the CFA can take on different embodiments with the colors being distributed across the sensor circuit according to other patterns. For example, FIG. 2 illustrates another embodiment of the invention as circuit 200 wherein the CFA has alternating columns of a particular color. In this case, a single shutter control line for each color couples with the shutter inputs of all photosites for a given color in multiple columns.

Although both FIGS. 1 and 2 show the sensor circuit having three colors (e.g., red, green and blue), the sensor circuit may also be configured with other combinations of two or more colors in its CFA, there being different colors available other than red, green, and blue, such as cyan, yellow, and magenta.

The embodiments of the invention in FIGS. 1a and 2 receive a number of shutter control signals, an example of which is illustrated in FIG. 1b as pulse type signals having different time division multiplexed pulses. The shutter control signals in FIG. 1b control an electronic shutter (not shown) inside each photosite. The electronic shutter may be a transistor switch which when turned on will allow the formation of light-generated signals inside a capacitor in the photosite. To read out the light-generated signal, row or column select signals are supplied to the readout circuitry in the photosite that causes the light-generated signal to appear (for example, as an analog voltage) at an output port of the photosite.

In the embodiment of FIG. 1b, the shutter control signals are pulses which go active simultaneously for all colors in the sensor circuit, but which end at different times depending on the spectral content of the illuminant. For example, the pulse widths for the red, blue, and green shutter control signals shown in FIG. 1b may have a ratio relationship related to the color temperature or spectrum of the illuminant. There are many techniques available for determining the color temperature or color spectrum of the illuminant.

One technique for obtaining the color spectrum of the illuminant and the relative pulse timing of the shutter control signals is briefly described below. First, the pulse width for a desired color's shutter control signal is set to be proportional to the ratio of the measured light energy for a base color to the measured light energy of the desired color during a given exposure time. The sensor array is exposed to an object having uniform reflectivity across all colors (e.g., a 20% gray card) for an initial exposure time that is the same for all photosites. Next, the measured light energy for each color is obtained by, for example, measuring the output of a number of photosites having the same color filter. For example, if the illuminant were a tungsten bulb such that the energy content at blue was considerably less then the energy content at red, then uniform shutter timing would result in an undesirably low detected signal level for the blue frequency. The blue signals (or blue color channel) would thus exhibit a lowered dynamic range as compared to the red signals (red color channel).

One color is selected as the base color, such as, for example, the color with the highest intensity. Thus, if the pulse width for the blue shutter control signal is set to $t_{blue}$ =1 time unit, then the pulse with $t_x$ for a color X is given by $t_x = t_{blue} * Blue_{meas}/X_{meas}$ where $Blue_{meas}$ and $X_{meas}$ are proportional to measured light energy signals for the base color Blue and desired color X, respectively. As shown in FIG. 1b, the two pulses with the smaller widths (e.g., blue and green) are then divided into set of sub-pulses, such that the sum of the widths of the sub-pulses equal the determined pulse width. For example, red has the longest pulse width $t_R$ with a total integration time of $t_{Red}$ that is equal to $t_I$, the integration time for the image capture. Green has the second longest pulse width split into four sub-pulses, $t_{G1}$, $t_{G2}$, $t_{G3}$ and $t_{G4}$ with a total integration time of $t_{Green}$. Blue has the shortest pulse width split into four sub-pulses, $t_{B1}$, $t_{B2}$, $t_{B3}$ and $t_{B4}$ with a total integration time of $t_{Blue}$. In one embodiment, each of the two smaller pulse widths is split into the same number of sub-pulses (e.g., 4 in FIG. 1b). In another embodiment, the pulse for each of the two colors may be split into a different number of sub-pulses widths. For example, $t_{Blue}$ may be split into 2 sub-pulses instead of 4 sub-pulses. By time multiplexing the pulse widths of the integration signals, each color is sampled through-out the total integration time, reducing the effects of motion effects introduced by the shorter integration times being sampled only in one portion of the time period of the longer integration times.

The measured energy levels for each color are obtained using the same exposure time, but because the illuminant may have non-uniform intensity over the different colors, the measured energy levels for different colors may be different. For this example, since the intensity of the illuminant is highest at blue, the total shutter control signal pulse widths for red and green would be larger than for blue, in proportion to the ratios described above. This allows the photosites capturing red and green to be integrated over a longer period of time.

The spectral information may be normalized prior to further processing of the digitized light-generated signals, in that the normalized energy value:

$$X = \frac{X_{meas}}{t_x}$$

for each color is integrated over the pulse width or integration time tx to obtain the total number of photons detected in the interval for the particular color.

Another technique for obtaining the spectral ratios needed for the relative timing of the different shutter control signals uses a histogram of digital image data received from the sensor circuit. The needed information about the spectral content of the illuminant may be obtained after exposure of the sensor circuit, uniform in time across the different colors. This should yield for a given detected value (digital) the total number of photosites of the same color that detected that value. The histogram will thus present a distribution of photosites versus color energy, for a given scene and illuminant. By selecting a statistic, such as 95% of the cumulative distribution of pixels, the digital values for the different colors can be used to define a ratio that will be multiplied by a predetermined pulse width to give the desired pulse width of the particular color.

Some of the advantages of the embodiments of the invention may be illustrated by the following example. An optical subject such as the 20% reflective gray card typically reflects 20% of all incident energy substantially uniformly across all colors. A sensor circuit in accordance with an embodiment of the invention is placed in front of the 20% gray card so as to capture an image of the gray card. If the illuminant were, for example, daylight, such that the incident optical energy at each color was substantially the same, then a single exposure with uniform shutter timing (corresponding to equal pulse widths for the different color shutter control signals) would result in the same amount of energy collected by each photosite. This presents the ideal illuminant situation.

By using independent electronic shutter timing for the blue and red channels to increase the exposure time for the blue channel relative to the exposure time for the red channel, the analog signal level for the weaker channel may be increased prior to A/D conversion thus allowing greater dynamic range in the weaker channel.

Figure 3:
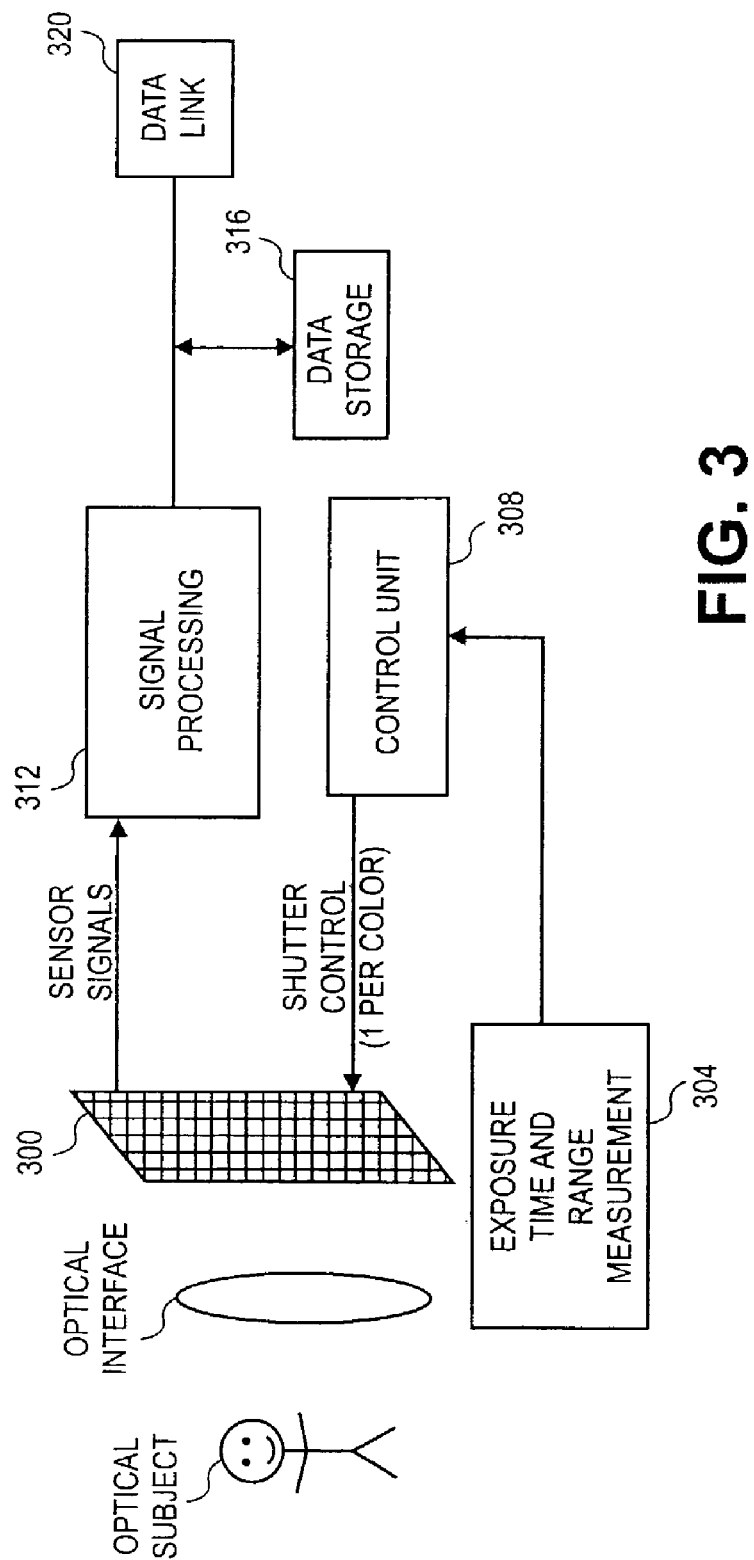
FIG. 3 shows an image capture system according to one embodiment of the present invention.

A system embodiment of the invention as an imaging or image capture system is illustrated in FIG. 3. The system includes an optical interface that directs light reflected from an optical subject to a sensor circuit 300. The sensor circuit 300 includes a color sensor array as in any one of the circuits 100 and 200 described earlier. The sensor circuit 300 receives a number of independent shutter control or integration timing signals (one per color) from the control unit 308. The control unit 308 may be implemented as a hardwired logic circuit, or as a programmed processor with a suitable I/O peripheral, and may or may not be located in the same IC containing the sensor circuit 300.

The control unit 308 receives exposure time values and range measurements from block 304 that are used to define the shutter control timings. In block 304, the color temperature of the illuminant may be automatically determined as described above, or alternatively may be set manually by the user. The timing for each color may be automatically computed and provided, either by hardwired logic circuits or perhaps from an I/O peripheral of a programmed processor, in one or both of the block 304 and control unit 308.

The embodiment shown in FIG. 3 also provides that sensor signals from the sensor circuit 300 be transferred to signal processing unit 312. In one embodiment, the sensor signals may be in analog form to be converted into digital form by an A/D converter in the signal processing unit 312. Alternatively, the A/D conversion units may be part of sensor circuit 300 so that the sensor signals passed to unit 312 are digital. In either case, the A/D conversion units may be located on the same IC as the sensor array.

In addition, the unit 312 may be configured to perform digital image processing such as noise suppression and color space conversion. Such digital processing by unit 312 may be performed by a programmed processor or by dedicated hardwired logic circuits.

After image data has been prepared by unit 312, the data may be stored in a data storage 316 which may be any conceivable type of storage device suitable for storing digital data. Modern examples include a non-volatile random access memory and a rotating media device such as magnetic and/or optical disk storage. A data link interface 320 permits the image data to be transferred outside the image capture system to, for example, a desktop computer via a serial communications link.

The embodiments of the invention described above may be used to assist in correcting for manufacturing variations that induce a type of imbalance in the different color channels. For example, the optical filters for a given color channel may have unequal bandpass properties due to differences in the CFA between production batches. Also, the optical components of the imaging system may present non-uniformity across the various colors. Such variations add to the imbalance between the color channels that is created by illuminants having non-uniform intensity. The independent shutter control of the various embodiments of the invention helps to equalize the light-generated analog signals between the different color channels, and therefore also help reduce the effects of the manufacturing variations.

Another advantageous feature of the circuits 100 and 200 appears when the sensor array is implemented as a single chip. This allows simultaneous rather than sequential duration exposures for all colors, so that the imaging system that incorporates the single chip sensor array may yield higher quality color images of a moving scene.

Figure 4:
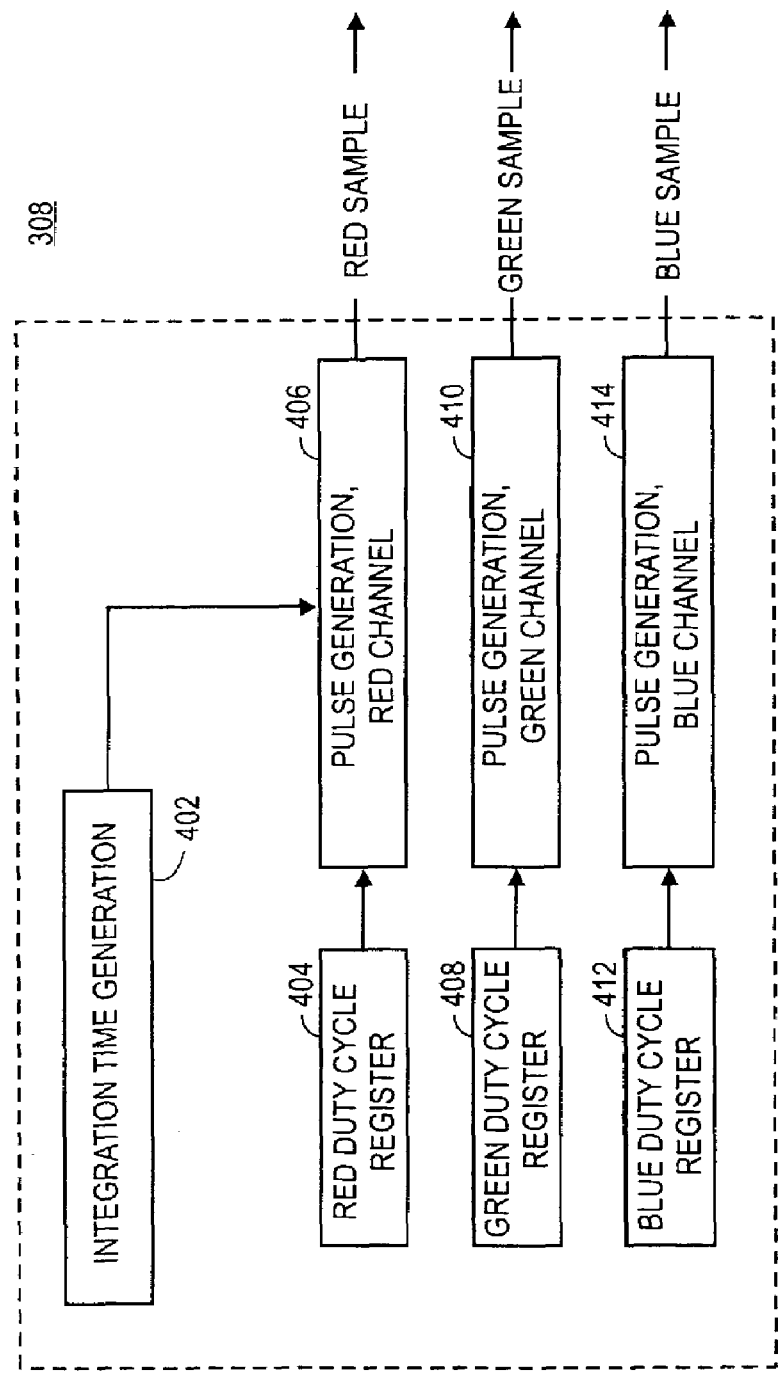
FIG. 4 illustrates an integration control unit of the image capture system of FIG. 3 configured in accordance with one embodiment of the present invention.

FIG. 4 illustrates one embodiment of control 308 configured to generate different integration times with an integration time generation unit 402, a red channel pulse generation unit 406, a green channel pulse generation unit 410, and a blue channel pulse generation unit 414. A red duty cycle register 404, a green duty cycle register 408, and a blue duty cycle register 412 are connected to red channel pulse generation unit 406, green channel pulse generation unit 410, and blue channel pulse generation unit 414, respectively. Each of the duty cycle registers are programmed to a particular duty cycle to generate the proper pulses for that color. The pulse generation units generate the set of sample signals for the sub-pulses that make up the complete pulse. Integration time generation unit 402 provides the total integration time for the capture of each frame.

To summarize, the embodiments of the invention described above present the design of an improved and novel color image sensor circuit that features independent electronic shutter control for each color channel. Of course, the embodiments of the invention described above are subject to other variations in structure and implementation. For example, semiconductor IC fabrication techniques other than standard CMOS may be used to implement the different embodiments. Thus, the details above should be interpreted as illustrative and not in a limiting sense.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   determining a first integration time for a first color channel;
   determining a second integration time for a second color channel, where the second integration time is shorter than the first integration time;
   dividing the second integration time into a set of integration times;
   integrating a first sensor over the first integration time; and,
   integrating a second sensor over the set of integration times.

2. The method of claim 1, where dividing the second integration time into the set of integration times includes dividing the second integration time by a predetermined number to generate the set of integration times, where a sum of all integration times in the set of integration time equals the second integration time.

3. The method of claim 1, where integrating the second sensor over the set of integration times includes integrating the second sensor over each of the set of integration times.

4. The method of claim 3, where integrating the second sensor over each of the set of integration times includes generating a set of sample signals to the second sensor, where each sample signal in the set of sample signals corresponds to a respective integration time in the set of integration times.

5. The method of claim 1, where the set of integration times are dispersed throughout the first integration time.

6. An article comprising a computer readable medium having instructions stored thereon, which when executed, causes:
   determination of a first integration time for a first color channel;
   determination of a second integration time for a second color channel, where the second integration time is shorter than the first integration time;
   division of the second integration time into a set of integration times;
   integration of a first sensor over the first integration time; and,
   integration of a second sensor over the set of integration times.

7. The article of claim 6, where division of the second integration time into the set of integration times includes division of the second integration time by a predetermined number to generate the set of integration times, where a sum of all integration times in the set of integration time equals the second integration time.

8. The article of claim 6, where integration of the second sensor over the set of integration times includes integration of the second sensor over each of the set of integration times.

9. The article of claim 8, where integration of the second sensor over each of the set of integration times includes generation of a set of sample signals to the second sensor, where each sample signal in the set of sample signals corresponds to a respective integration time in the set of integration times.

10. The article of claim 6, where the set of integration times are dispersed throughout the first integration time.

11. An apparatus comprising:
    an image sensor having a first sensor for a first color channel and a second sensor for a second color channel; and,
    an control unit coupled to the image sensor, the control unit having:
       a integration time generation unit;
       a first color channel pulse generation unit coupled to the first sensor;
       a first duty cycle register coupled to the first color channel pulse generation unit;
       a second color channel pulse generation unit coupled to the second sensor; and,
       a second duty cycle register coupled to the second color channel pulse generation unit;
    where the first color channel pulse generation unit generates a set of sample signals to the first sensor based on a value contained in the first duty cycle register wherein the sample signals represent a first shutter control pulse width for the first color channel being split into a plurality of sub-pulses whose sum width equals the first pulse width.

12. The apparatus of claim 11, where the second color channel pulse generation unit generates a second set of sample signals to the second sensor based on a second value contained in the second duty cycle register wherein the second set of sample signals represent a second shutter control pulse width for the second color channel being split into a plurality of sub-pulses whose sum width equals the second pulse width.

13. The apparatus of claim 11, where the set of sample signals are a set of pulses having a duty cycle based on the value contained in the first duty cycle register.

14. The apparatus of claim 11, further comprising a signal processing unit coupled to the first image sensor to receive an output.

15. The apparatus of claim 14, where the signal processing unit receives a set of sampled signals from the first sensor based on the set of sample signals and is configured to combine the set of sampled signals into a single output.

* * * * *